Figure 1:
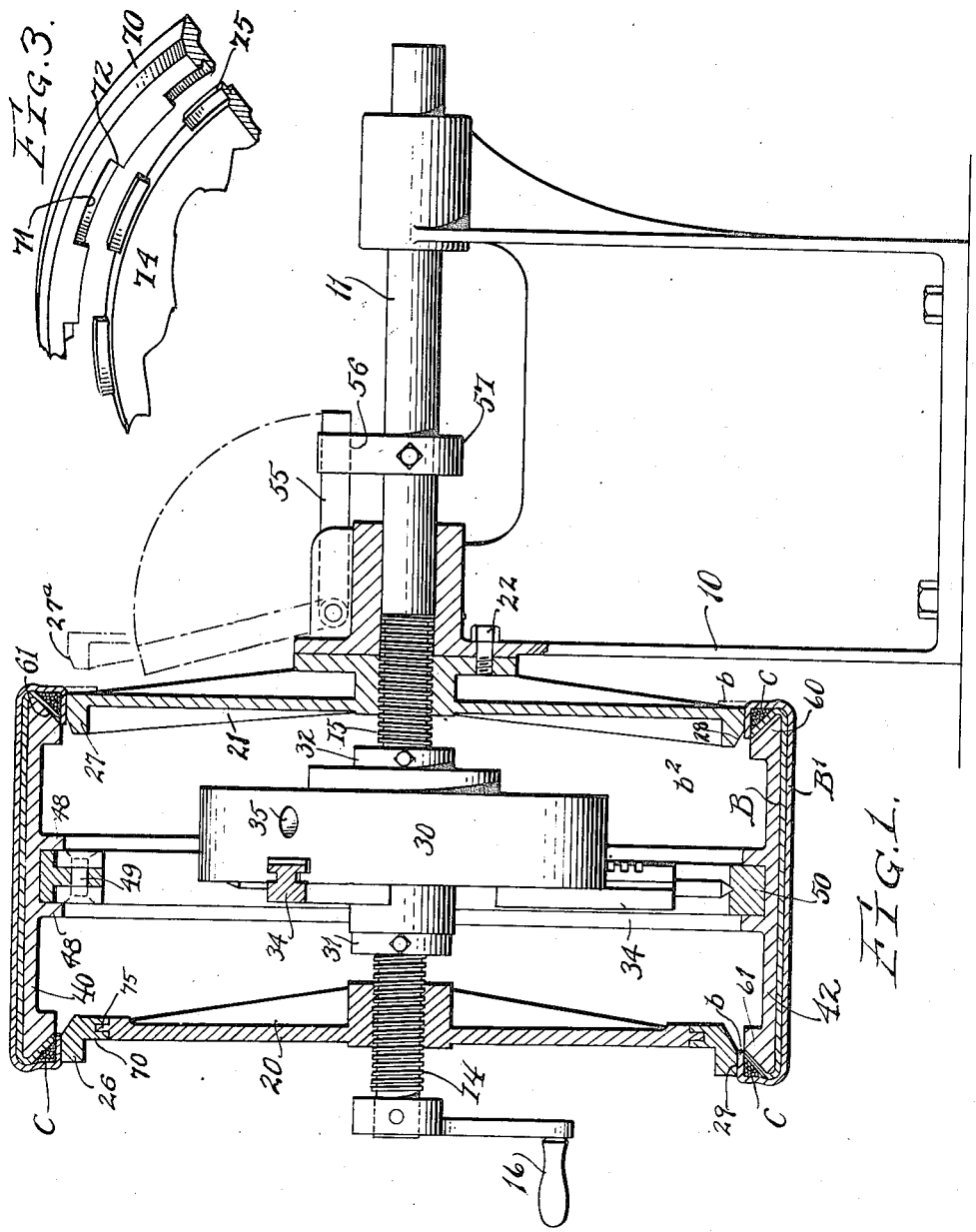

J. D. TEW.
METHOD OF MAKING TIRE CASINGS.
APPLICATION FILED DEC. 13, 1915.

1,242,073.

Patented Oct. 2, 1917.
3 SHEETS—SHEET 1.

Inventor
James D. Tew,
By Albert H. Baker,
Atty.

J. D. TEW.
METHOD OF MAKING TIRE CASINGS.
APPLICATION FILED DEC. 13, 1915.

1,242,073.

Patented Oct. 2, 1917.
3 SHEETS—SHEET 2.

Inventor
James D. Tew,
By Albert H. Baker,
Atty.

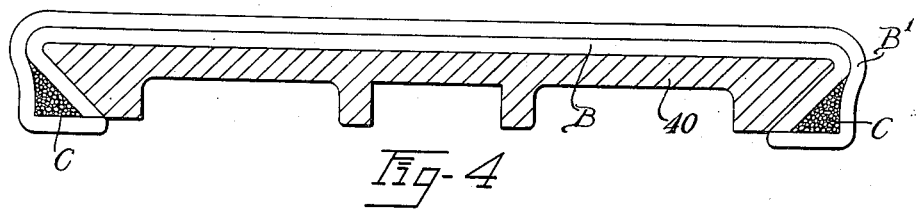
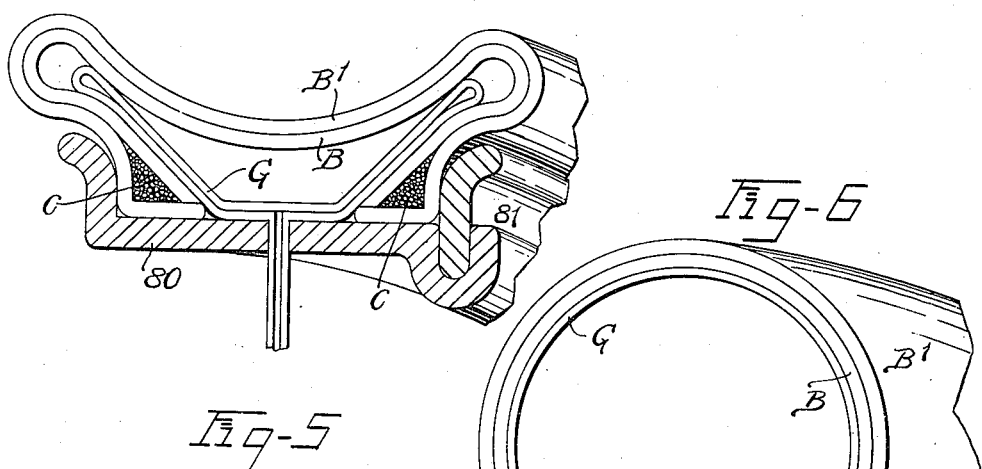
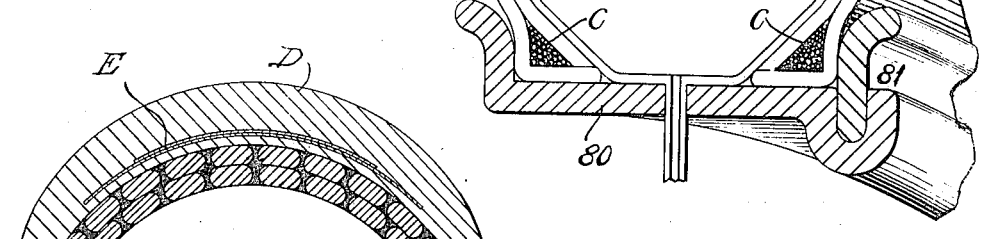
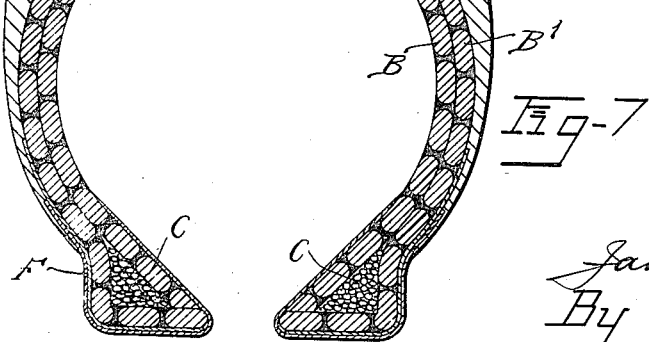

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

METHOD OF MAKING TIRE-CASINGS.

1,242,073.   Specification of Letters Patent.   Patented Oct. 2, 1917.

Application filed December 13, 1915. Serial No. 66,406.

*To all whom it may concern:*

Be it known that I, JAMES D. TEW, a citizen of the United States, residing at Akron, in the county of Summit and State of Ohio, have invented a certain new and useful Improvement in Methods of Making Tire-Casings, of which the following is a full, clear, and exact description, reference being had to the accompanying drawings.

The object of this invention is to provide for the cheap and rapid manufacture of casings for pneumatic tires, and more particularly to provide for the manufacture of the carcass of such casings from a fabric comprising parallel rubberized cords and inextensible beads applied and firmly affixed thereto.

To carry out my process I take an unwoven fabric formed of parallel rubberized cords held together by adhesive and I cut a bias strip therefrom at an angle of substantially forty-five degrees, the length of the strip being sufficient to reach circumferentially about the tire carcass and the width of it being sufficient to reach laterally from bead to bead. I lay this strip on a drum-like form which has a substantially cylindrical surface with rounded and inwardly extending edges, the strip being laid without stretching, and one bias end thereof coming contiguous to the other bias end. Beads, which may be of stranded wire embedded in rubber, are now applied to the outer edge of the strip where it overhangs the edge of the drum, adhesion of the rubber securing the bead in place. A second ply of corded fabric, with the cords extending at substantially right angles to the first ply, is laid over such first ply, an intermediate layer of rubber having been applied if desired. This second ply extends onto the outside of the applied bead and is then lapped beneath it.

The form on which the tire has been built is now collapsed, and the tire structure is removed and placed, with an air tube inside of it, within a suitable rim similar in internal shape to the wheel rim with which the tire is to be used. Air pressure is now applied to this inner tube and the carcass thus caused to assume the arched form which it is to have in the finished tire. Then the breaker strip, tread and side strips are applied and the tire vulcanized in any approved manner.

It is an important characteristic of my invention that the bead is secured in place to the cord plies in substantially the position which it is to occupy in the finished tire. This prevents undue straining when the cylindrical envelop is transformed into tire shape. Moreover, by my method of building the tire on a collapsible drum I may employ the desired inextensible beads, which it would be impossible to stretch over the former in removing the beaded envelop.

It is important in building a tire by my method that the form on which the plies are laid be of a cylindrical character, so that there may be no stretching of the fabric, which would separate the cords from each other, as there are no crossing threads to hold them. After the second ply is laid across the first, each ply holds the other against distortion. It is primarily to avoid the stretching and distortion of the first ply before the second is laid that I employ the cylindrical former or drum referred to; and it should be understood that I use the term drum herein as indicating a former which is substantially cylindrical except at its edges, which are rounded over and otherwise formed to accommodate the beads.

The drawings illustrate the various steps of my process in connection with a convenient apparatus which may be employed in performing some of those steps. The invention is hereinafter more fully explained as thus illustrated, and the essential features of the process are summarized in the claims.

Figure 2:
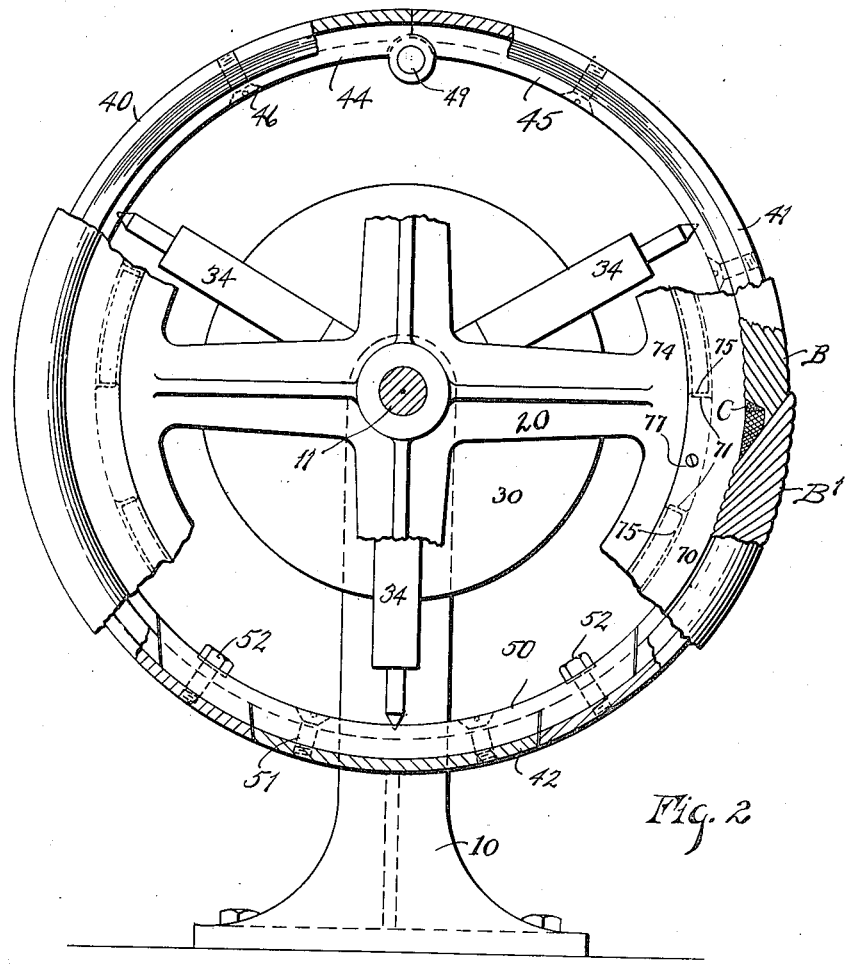
Figures 8, 9:
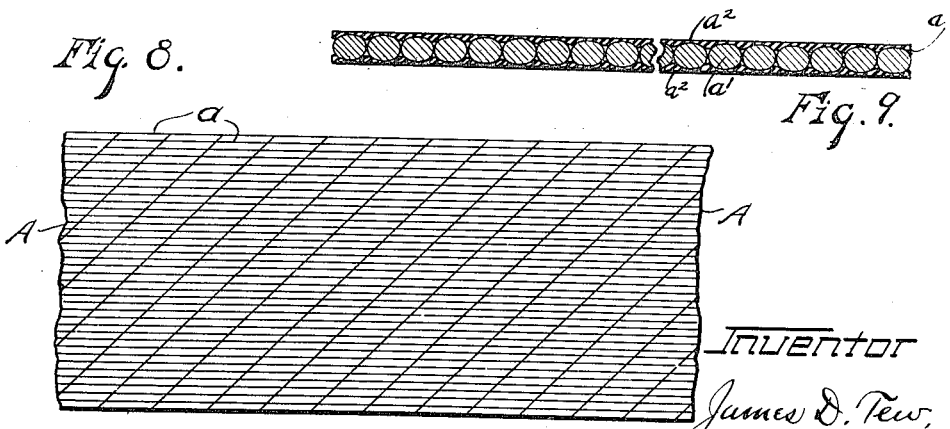

In the drawings, Figure 1 is a vertical section of an apparatus for forming the cylindrical envelop and applying the beads thereto; Fig. 2 is a sectional end view thereof; Fig. 3 is a fragmentary perspective looking outwardly, of a portion of the rim of the outer spider shown in Figs. 1 and 2, illustrating the manner in which the peripheral portion of this rim may be moved; Fig. 4 is a cross section through the rim of the form, showing the carcass at the stage ready for removal from this form; Fig. 5 is a somewhat diagrammatic cross section through an annular holder similar to a wheel rim, showing the carcass placed therein with a deflated tube within it; Fig. 6 is a cross section of the same parts after the inner tube has been inflated; Fig. 7 is a cross section of the finished tire; Fig. 8 is a plan of the fabric from which the tire is made; Fig. 9 is a cross-section on an enlarged scale of one of the bias strips cut from such fabric.

In carrying out my process, I start with a sheet of fabric made of rubberized cords laid adjacent to each other and covered on one or both sides with sheets of gum. The cords are thus held to each other by adhesive, and there are no crossing strands as in woven fabrics. Fig. 8 shows the primary sheet designated A. The width of the sheet is such that a bias strip at forty-five degrees will have the proper length to reach entirely around the tire form circumferentially. Bias strips $a$ are cut from this sheet, the width of the strip (that is at right angles to the cut across the sheet) corresponding to the lateral distance about the tire carcass from bead to bead. Fig. 9 is a cross section of this bias strip and shows the cords $a^1$ and the rubber above and below and intermediately at $a^2$. The individual cords in the fabric may be round or of other shape, as desired. In the drawings they are round and thus show elliptically in the cross section, which indicates the cords cut at an angle of forty-five degrees.

Figs. 1, 2 and 3 show an apparatus on which the tire carcass is initially formed from bias strips, as described, and suitable beads applied while the fabric is on the apparatus. As shown in Figs. 1 and 2, 10 is a suitable base or support on which is rotatably mounted a shaft 11. This shaft is provided with right and left hand threads 14 and 15, and with suitable means for rotating it as indicated by the crank 16. Threaded onto the threads of the shaft are spiders 20 and 21, the former of which is free to move and the latter of which is preferably secured to the frame 10, as indicated by the screw 22. The purpose of these spiders will be elaborated later.

Rotatably mounted on the shaft 11 is a universal chuck 30, prevented from longitudinal movement by collars 31 and 32 clamped to the shaft, and having a plurality of radial arms (three being shown) designated 34, which may be caused to move radially in unison. The internal mechanism of this chuck may be of any well known form. 35 in the drawings indicates a hole for the reception of a suitable wrench, the turning of which will force the arms outwardly or inwardly.

The chuck arms described engage the inside of a built-up drum and thus center it around the axis of the shaft 11. This drum is shown as consisting of two sections 40 and 41, each somewhat less than a semi-cylinder, which are hinged together, and a third section 42, which fills the gap diametrically opposite the hinge.

As clearly shown in Fig. 2, the hinging of the drum sections is accomplished by means of circumferential ribs 44 and 45, fastened by screws 46 to the rim and centrally positioned by flanges 48 which may be formed on the inner periphery of the drum sections. The hinge is of any ordinary form, as, for example, by means of a tongue on the member 45 extending between ears on the member 44 connected by a pintle 49. The ribs 44 and 45 terminate their ends some distance short of the edge of the drum sections 40 and 41, thus leaving a space between the flanges 48. This space is occupied by a removable rib 50 which is adapted to lie between the flanges and extends substantially from the rib 45 to the rib 44. This removable rib is permanently secured, as by screws 51, to the removable section 42 of the drum. When the drum is assembled bolts 52 pass through the removable rib into the sections 40 and 41 of the drum, thus forming a rigid drum cylinder, which, as stated, is positioned by the chuck arms.

The shaft 11 is normally held stationary by suitable means, as, for example, a dog 55, which is shown as pivoted to the frame 10 and as normally occupying the notch 56 in the collar 57 rigid on the shaft 11.

It will be noted that the main portion of the drum described is cylindrical, but at the edges it rounds inwardly as shown at 60, and then at the extreme edge is formed with a beveled face, as indicated at 61. The dimensions of the drum are, of course, proportioned to the dimensions of the tire casing to be produced. The distance across the face parallel with the axis and around the two rounded edges and inwardly to the inner periphery at the rim is slightly less than the lateral internal contour of the tire, and the internal periphery of the drum edges is slightly less than the internal periphery of the tire at the bead. The difference between the dimensions of the drum and dimensions of the tire above noted are due to the allowance of space for extending one ply of fabric within the inner periphery of the applied bead, as will hereinafter clearly appear.

In making the tire carcass on the apparatus just described, I apply rubber cement or adhesive to the beveled edge 61 of the form. I then take a bias strip $a$, as above described, and lay it without stretching, around the drum with the two bias ends coming contiguous to each other, thus making a complete cylindrical envelop. The edges of the strip are now secured to the edges of the drum-rim by the adhesive which has been applied.

After the first ply of corded fabric is placed and secured, as described, I take the beads C, which preferably consist of stranded wires embedded in rubber, and apply them adjacent to the edge portion of the fabric where it is cemented to the beveled edge of the former. The adhesion of the rubber holds these beads in place. If desired, I place over the first ply a sheet of rubber, or I can lay the second ply directly on the first, as the plies are made of rubberized cords and are covered on one or both sides with rubber in sheet form.

Now I place the second ply consisting of a bias strip with the cords lying at right angles to those of the first strip. This second strip is somewhat wider than the first strip so that the edges thereof extend inwardly beyond the inner periphery of the beads, such edges being indicated in dotted lines at $b$ in Fig. 1. Before the second ply is put in place the spiders 20 and 21 are separated, this separation being effected by swinging up the locking dog 55 (into the position shown in dotted lines in Fig. 1), and then turning the crank 16. This separation of the spiders may take place at any time preceding the placing of the second ply. After the second ply is placed, the spiders being separated, the inner edges $b$ of the ply will lie between the rim portions 26 and 27 of the respective spiders. The spread position of the spiders is indicated diagrammatically by the dotted portion 27$^a$ in Fig. 1.

It will be seen that the rim portions of the spiders are beveled at their inner edges, as at 28, and then extend outwardly in a cylindrical portion 29. This cylindrical portion has a radius which is less than the radius of the inner edge 61 of the rim by an amount substantially equal to the thickness of the outer ply. The edge of the inner ply terminates substantially adjacent to this inner edge of the rim and the inner face or base of the bead is substantially in line with the inner face of the rim.

Now the crank 16 is turned in the direction to cause the two spiders to travel relatively toward each other beneath the rim, thus gradually bending in the edges of the outer ply beneath the beads and causing such plies to firmly adhere to the lower face of the beads and lie smoothly thereon. I have stated that the two spiders move relatively toward each other. Since one of these spiders, however, is preferably stationary, the rim moves toward it instead of it moving toward the rim, and the other spider moves twice as fast (due to the right and left hand thread) toward the stationary spider, the result being the closing in of the spiders beneath the rim.

The relative inward movement of the two spiders is preferably continued by turning the crank until they have passed entirely within the beads and clear them. Then the carcass is ready for removal. To enable this removal I make the rim portion of the spider 20 separable, as shown most clearly in Fig. 3. As there shown the spider rim comprises an outer portion 70 formed with a peripheral groove 71 having side notches 72 therein, and an inner portion 74 having spaced arcual ribs 75 which are adapted to stand in staggered relation to the notches or register therewith. Accordingly, by turning the rim circumferentially a slight distance the ribs may register with the notches and the outer portion be removed. A suitable set screw 77 (Fig. 2) prevents the inadvertent separation of the parts.

After the removal of the outer portion 70 of the rim of the spider 20, the drum with the carcass thereon, is removed from the chuck, and is collapsed by removing the bolts 52 and removing inwardly the removable section of the drum and swinging the hinged sections together. This allows the carcass to be conveniently removed over the spider 20 without distorting the beads or changing their position. The crossing plies of the carcass, together with the adhesive, holds the carcass in shape after removal.

The carcass is now placed in a suitable separable holder, shown at 80 and 81 in Fig. 5, which has the internal shape of the rim of the wheel for which the casing is designed, an inner air tube G being put in the carcass before it is thus placed. This air tube is now inflated with air under pressure, bringing the carcass into the form shown in Fig. 6. Now the breaker strip indicated at E, the tread portion D and the side portions are applied, completing the tire formation, and the tire is vulcanized in any approved manner.

In the finished tire of Fig. 7 are shown the external canvas strips F embracing the corded bead. The use of these canvas strips is an important aid in securing permanent adhesion of the cords to each other and to the bead rings or fillers C. This canvas may be applied before the carcass is transferred to the holder of Figs. 5 and 6 but is omitted in those views for clearness of illustration. Figs. 4 to 7 are designed to emphasize the important point that in my process the beads are retained in the same position throughout the operation. In other words they are originally applied in the form they have in the finished tire and their faces have constant angular positions with reference to the axis of the tire. Accordingly I am able to use the desirable inextensible beads. Moreover, my process enables the operation to be carried out cheaply and rapidly.

Having thus described my invention what I claim is:

1. The process of making tire casings consisting of forming an inner ply in a substantially cylindrical form with inwardly extending edges, securing to said edges beads the inner faces of which constitute a substantially cylindrical surface when applied, applying an outer ply which extends over the outside of said beads, removing the carcass comprising the plies thus formed, causing it to assume a tire shape, and completing the tire.

2. The process of making tire casings consisting of forming an inner ply in a substantially cylindrical form with inwardly extending edge portions, securing to the outer faces of said edge portions beads which stand in substantially the same position they will have in the finished tire, applying an outer ply which extends over the outside of said beads, extending said outer ply onto the inner periphery of the beads, removing the carcass thus formed, causing the carcass to assume a tire shape and completing the tire.

3. The process of making tire casings consisting of forming an inner ply in a substantially cylindrical form with inwardly extending edge portions, securing to the outer faces of said edge portions beads the inner faces of which when applied constitute a substantially cylindrical surface of less diameter than that of the main portion of said inner ply, applying an outer ply which extends over the outside of said beads, removing the carcass thus formed, causing it to assume a tire shape, and completing the tire.

4. The process of making tire casings consisting of laying a ply of fabric in a cylindrical form with inwardly bent edges, applying a bead of less diameter than that of the intermediate portion of said ply to the outer face of such edges, laying over such ply a second ply in cylindrical form with inwardly bent edges which lie on the outer side of the bead, then bending in the edges of the outer ply beneath the bead, thereafter causing the carcass to assume a tire shape and applying the necessary parts to the outer side thereof.

5. The process of making tires consisting of cutting a bias strip from a fabric made of parallel cords, placing such bias strip in a substantially cylindrical form with the two bias ends contiguous, bending in the edges of the cylinder thus formed, applying beads to such bent in edges, the beads occupying substantially the position they will have in the finished tire, removing the carcass thus formed, subsequently causing the carcass to assume a tire shape, and completing it while in that shape.

6. The process of making tires consisting of cutting a bias strip from a fabric made of parallel cords, placing such bias strip in a substantially cylindrical form with the two bias ends contiguous, bending in the edges of the cylinder thus formed, applying beads to such bent in edges, applying over the parts described a bias strip of parallel cords, the cords lying transversely of those of the first ply, bending the edges of the outer ply onto the outer sides of the beads, and inwardly beneath the beads, and subsequently causing the carcass to assume a tire shape and completing it.

7. The process of making tire casings consisting of laying a ply of fabric about a drum, the edge portion of the ply extending inwardly across the edge of the drum, affixing a bead to the outer face of such inwardly extending edge portion, placing a second ply over the first ply and extending it over the outer side of the bead, removing such carcass from the drum, placing an inner tube within the carcass, and placing the carcass and tube within a holder corresponding to a wheel rim, inflating the inner tube, and completing the tire.

8. The process of making tire casings consisting of laying a ply of fabric about a drum, the ply overlapping the edge of the drum, and extending inwardly at such edge, affixing a bead to the outer face of such edge portion of the ply, placing a second ply over the first ply and extending it over the outer side of the bead and inwardly onto the inner periphery of the bead, removing such carcass from the drum, causing the carcass to assume a tire shape, and completing the tire.

9. The process of making tire casings consisting of cutting bias strips from a fabric made of parallel rubberized cords, placing one of such strips about the periphery of a drum with one bias end contiguous to the other bias end and with the edges of the strip overhanging the edges of the drum, bending such edges of the strip inwardly over the edges of the drum, applying beads to the outer sides of such bent-in edges in substantially the position such beads will occupy in the completed tire, thereafter applying over the first strip a second strip, the cords extending transversely to those of the first ply, subsequently causing the carcass thus produced to assume a tire shape, and completing the casing.

10. The process of making tire casings consisting of cutting bias strips from a fabric made of parallel rubberized cords, placing one of such strips about the periphery of a drum with one bias end contiguous to the other bias end and with the edges of the strip overhanging the edges of the drum, bending such edges of the strip inwardly over the edges of the drum, applying beads to the outer sides of such bent-in edges, thereafter applying over the first strip a second strip with cords extending transversely to those of the first ply, bending the edges of the second ply inwardly onto the outside of the bead and onto the inner periphery of the bead, and subsequently causing the carcass thus produced to assume a tire shape, and completing the casing while in this shape.

11. The process of making tire casings consisting of taking a strip of fabric, the dimensions of which correspond approximately to the internal periphery and the internal transverse contour of the finished tire, laying such strip of fabric on a drum with the edge portions of the fabric extending inwardly over the edges of the drum, applying beads to the outer sides of such inturned fabric edges, the inner periphery of each bead constituting substantially a cylinder approximately the diameter of the inner periphery of the finished tire, laying a second strip of fabric on the outside of the strip first mentioned and thereafter removing the carcass thus formed and causing it to assume a tire shape.

12. The process of making tire casings consisting of taking a strip of fabric, the dimensions of which correspond approximately to the internal periphery and the internal transverse contour of the finished tire, laying such strip of fabric on a drum and over the edges of the drum, applying a bead to the outer side of such inturned fabric edges, the inner periphery of the bead constituting substantially a cylinder approximately the diameter of the inner periphery of the finished tire, applying over the ply above mentioned a second ply of fabric which laps over the outside of the bead and inwardly over the inner periphery thereof, removing the carcass thus formed, and causing it to assume a tire shape, and completing the finished tire.

13. The process of making tire casings consisting of laying a sheet of fabric over a collapsible drum the edges of the fabric extending beyond the drum, bending such edges of the fabric inwardly across the edges of the drum, applying beads to the outer sides of the bent-in fabric edges, laying a second ply of fabric onto the first ply, bending in the edges of the second ply onto the outside of the bead, collapsing the drum, removing the carcass therefrom and placing it in a holder of a shape corresponding to the wheel rim with which the tire is to be used, distending the carcass while in such rim into tire shape, and completing the construction of the tire.

14. The process of making tires consisting of cutting a bias strip from a fabric made of parallel cords, placing such bias strip in a substantially cylindrical form around a collapsible drum, bending the edges of the fabric inwardly across the edges of the drum and temporarily securing them, applying beads to the outer sides of the bent-in fabric edges, laying a second ply of cord fabric onto the first ply, bending in the edges of the second ply onto the outside of the beads, and extending such edges onto the inner periphery of the beads, collapsing the drum, removing the carcass therefrom and placing it in a holder of a shape corresponding to the wheel rim with which the tire is to be used, distending the carcass while in such rim into tire shape, and completing the construction of the tire.

15. The process of making tire casings involving the employment of a drum having its edges rounded and beveled inwardly, consisting of placing over such drum a strip of fabric with the edges overhanging, bending such edges inwardly across the rounded and beveled edges of the drum, applying beads at such beveled edges on the outside of the strip, laying a second ply over the first ply, said second ply passing over the outside of the bead, collapsing the drum, and removing the carcass and thereafter causing it to assume a tire shape and completing the tire.

16. The process of making tire casings involving the employment of a drum having its edges rounded and beveled inwardly, consisting of placing over such drum a strip of fabric with the edges overhanging, bending such edges inwardly across the rounded and beveled edges of the drum, applying beads at such beveled edges on the outside of the strip, the beads standing in substantially the position they will have in the finished tire, laying a second ply over the first ply, said second ply passing over the outside of the beads and inwardly beyond the same, shoving ring-members into the beads to cause the extreme portions of said second ply to lie smoothly within the beads, collapsing the drum and removing the carcass.

17. The process of making tire casings consisting in placing a strip of fabric about the periphery of a collapsible drum, the edges of the strip overhanging the drum, bending inwardly the edges of the strip to cause them to terminate adjacent to the inner periphery of the drum at the edges thereof, affixing beads to the outer side of the ply at the edges of the drum, laying a second ply over the first ply, the edges of the second ply overlapping the bead and extending some distance inwardly thereof, then forcing relatively inward suitable ring members to bend the inwardly extending edges of the outer ply inwardly along the inner face of the beads, thereafter collapsing the drum and displacing one of the ring members sufficiently to allow the removal of the carcass.

18. The process of making tire casings consisting of cutting bias strips from a fabric made of parallel rubberized cords, placing one of such strips about the periphery of a collapsible drum with one bias end contiguous to the other bias end and with the edges of the strip overhanging the edges of the drum, bending inward such edges of the strip onto the edges of the drum, securing such bent-in edges of the fabric to the drum, affixing beads to the outer side of the ply at the edges of the drum, the beads standing with their bases substantially cylindrical, laying a second ply over the first, the edges of the second ply overlapping the beads and extending some distance inwardly thereof, then forcing relatively inward suitable ring members to bend the inwardly extending edges of the outer ply inwardly to a cylindrical form along the inner face of the beads, thereafter collapsing the drum and displacing one of the ring members sufficiently to allow the removal of the carcass, removing such carcass, and causing it to assume a tire shape and completing the tire casing.

19. The process of making tire casings consisting of forming a ply with an intermediate cylindrical portion and edges extending inwardly at an acute angle thereto, then applying bead rings to the outer faces of such acute angle portions, then placing a second ply on the ply first mentioned with its edge portions extending on the outer side of the bead rings, and thereafter causing the carcass thus formed to assume a tire shape, and completing the casing.

20. The process of making tire casings consisting of forming a ply with a substantially cylindrical intermediate portion and with inwardly extending edges, applying bead rings which are substantially triangular in cross section to such edges, placing a second ply on the ply first mentioned with its edge portions extending on the outer side of the bead rings and lapped inwardly onto the inner periphery of the bead rings, and then completing the tire casing.

21. The process of making tire casings consisting of laying a bias strip about a drum with the edges overhanging the edges of the drum, bending such edges inwardly at an acute angle to the drum surface, applying triangular bead rings to the outer faces of such inwardly bent portions, then laying a separate bias strip on top of the strip first mentioned and lapping the edges thereof inwardly across the outer faces of the bead rings and then inwardly onto the inner periphery of the bead rings, and thereafter completing the tire casing.

22. The process of making tire casings consisting of forming a substantially cylindrical ply with inwardly bent edge portions, applying bead rings to the edge portions of such ply, laying another ply on top of the ply first mentioned and extending across the outer side of the bead rings, and binding the bead ring to the plies mentioned by means of a canvas strip secured to the inner surface of the casing and extending beneath the bead and upwardly onto the outer side thereof.

23. The process of making tire casings consisting of laying a ply about a drum with the edges inwardly bent, applying bead rings to such inwardly bent portions, laying a second ply over the ply first mentioned and extending the same over the outer face of the bead rings and inwardly onto the inner periphery of the bead rings, and applying canvas to the inner face of the casing and extending the same outwardly beneath the beads and upwardly onto the outer sides of the beads.

24. The process of making tire casings consisting of laying a ply of parallel cords on the surface of a drum with the edge portions overhanging the drum edges, bending such edge portions inwardly at an acute angle to the intermediate portion and applying substantially triangular bead rings to the outer face of such inwardly bent edges, laying a second ply of parallel cords on the ply first mentioned with the edge portions extending inwardly on the outer face of the triangular bead rings and then inwardly onto the inner periphery of the bead rings substantially parallel with the intermediate portion of the ply, and placing canvas within the casing secured to the inner surface thereof and extending such canvas across the inner face of the bead formed by the two plies and the bead ring, and then upwardly onto the outer side of the outer ply.

In testimony whereof, I hereunto affix my signature.

JAMES D. TEW.